United States Patent [19]

Shimizu

[11] Patent Number: 4,752,230
[45] Date of Patent: Jun. 21, 1988

[54] PICTURE BOOK

[75] Inventor: Yuichi Shimizu, Kodaira, Japan

[73] Assignee: Dainippon Kaiga Co., Ltd., Tokyo, Japan

[21] Appl. No.: 34,384

[22] Filed: Apr. 2, 1987

[30] Foreign Application Priority Data

May 2, 1986 [JP] Japan .............................. 61-67609[U]

[51] Int. Cl.⁴ .............................................. G09B 5/06
[52] U.S. Cl. .................................. 434/317; 281/15 R
[58] Field of Search ............... 434/317, 308, 309, 178, 434/219, 224; 281/15 R

[56] References Cited

U.S. PATENT DOCUMENTS 3,964,179 6/1976 Bennett .......................... 434/219 X
4,642,054 2/1987 Wada .................................. 434/178

FOREIGN PATENT DOCUMENTS 60-39878 11/1985 Japan .

Primary Examiner—William H. Grieb
Attorney, Agent, or Firm—Koda and Androlia

[57] ABSTRACT

A picture book including a switch unit mounted on part of the book. The switch unit is arranged in the style of an immitated telephone dial and is provided with a plurality of switching means. The picture book also provides a sound generator having a unit for generating false musical instrumental sound corresponding to activated switching means.

The picture book is further provided with at least one of two kinds of leaves, the one containing a picture to allow the switch unit to be part of a telephone and the other one containing a picture which makes up part of musical instrument.

5 Claims, 3 Drawing Sheets

PICTURE BOOK

BACKGROUND OF THE INVENTION

1. Field of the Invention

The present invention relates to a picture book, more particularly, to a picture book allowing children to experience operation of a telephone and promote auditory education.

2. Description of the Prior Art

Conventionally, there is a picture book accompanied with a toy dial of a dial-type telephone integrally installed to the back-cover of the book.

This picture book allows children to enjoy themselves by viewing the book, and at the same time, it serves to satisfy children's potential desire to touch a telephone.

In addition, one of the preceding arts (Utility Model Publication No. 60-39878 (1985)) proposes a picture book accompanied with a toy which is a piano-like thinly-built electronic musical instrument integrally installed to the back-cover of the book.

Actually, this picture book allows children to enjoy themselves by viewing the book and playing music printed on the leaves using the thin electronic musical instrument to effectively promote auditory education for children.

Due to a simple function of the toy dial accompanied with the picture book mentioned earlier, even infants of about two years old can easily become familiar with this picture book. On the other hand, the content of this picture book is merely limited to stories about telephone without offering a variety of interesting subjects. As a result, there is a problem that infants of more than three years old easily and quickly tire of the picture book.

Conversely, since the toy of the piano-like electronic musical instrument provided in the latter picture book provides comparatively higher function than the toy-dial, there is a problem that infants of about two years old cannot easily become familiar with it, and yet, even those infants between three and five years old cannot fully enjoy it without receiving guidance and assistance from adults.

SUMMARY OF THE INVENTION

The object of the present invention is to provide a novel and useful picture book featuring two kinds of functions such as a toy-telephone and a toy-musical-instrument which provide a variety of contents in abundance and allowing wide range of people from infants of about two years of age to also adults to enjoy.

According to the present invention, a novel picture book is provided, including a sound generating device which includes a switch unit with a plurality of switching means disposed in the style of immitating the dial part of telephone and a sound generating unit mounted on the picture book for generating false musical instrument sound corresponding to each of the activated switching means; and at least either a leaf containing a picture for allowing said switch unit to be part of a telephone and another leaf containing a picture for allowing said switch unit to be part of musical instrument, whereby the picture book brings a pleasure in looking at a picture and additionally a pleasure in generating sound and a pleasure in operating the toy telephone. Thus, the picture book can create more a amusing time than any conventional picture book can offer. The picture book related to the present invention offers a wide variety of stories. The capability of the appended musical instrument to play a variety of nursery rhymes effectively helps promote children's basic music lessons.

DESCRIPTION OF THE PREFERRED EMBODIMENTS

Referring now more particularly to the accompanying drawings, one of the preferred embodiments of the picture book related to the present invention is described below.

Figure 1:
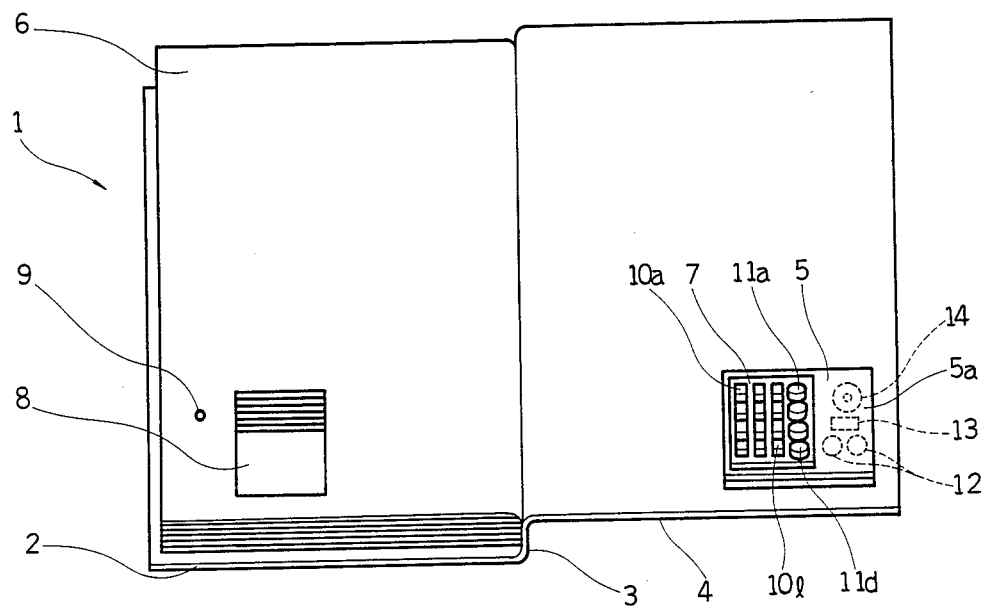
FIG. 1 is the perspective view of one of the preferred embodiments of the picture book related to the invention.

The picture book shown in FIG. 1 is substantially comprised of the following: a front cover 2, a back-bone 3, and a back-cover 4, which are respectively made by folding a cardboard. In addition, a sound generator 5 is bonded to a predetermined position of the back-cover 4. A plurality of leaves 6, 6, . . . are set to the back-bone 3, while each of these leaves 6, 6, . . . has a cutout portion 8 for allowing insertion of the switch unit 7 of the sound generator 5 and a sound outlet hole 9, respectively.

The switch unit 7 of the sound generator 5 is provided with a total of 16 switches including 12 switches $10_a$ through $10_l$ which are disposed in the style of buttons of a push-button telephone and other 4 switches $11_a$ thrugh $11_d$.

Figure 2:
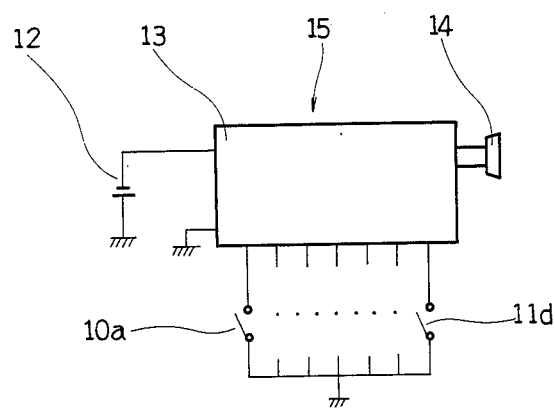
FIG. 2 is the simplified block diagram of the electric circuit of the picture book shown in FIG. 1.

As shown in FIG. 2, a micro-cell 12, an integrated circuit 13, and a thinly built speaker unit 14 are internally stored below a cover $5_a$ of the sound generator 5. Cover $5_a$ is freely detachable from the sound generator 5 for replacing micro-cell 12.

In an electric circuit 15 shown in FIG. 2, no power switch is provided and the micro-cell constantly feeds DC power to the integrated circuit 13. However, since the integrated circuit 13 is comprised of for example a CMOS-type integrated circuit featuring the least power consumption, the battery life is not a problem.

Switches $10_a$ through $10_l$ and $11_a$ through $11_d$ are respectively connected to the integrated circuit 13. As soon as one of these switches is pressed ON, the integrated circuit 13 causes speaker unit 14 to generate false piano sounds corresponding to the depressed switch.

Figure 3:
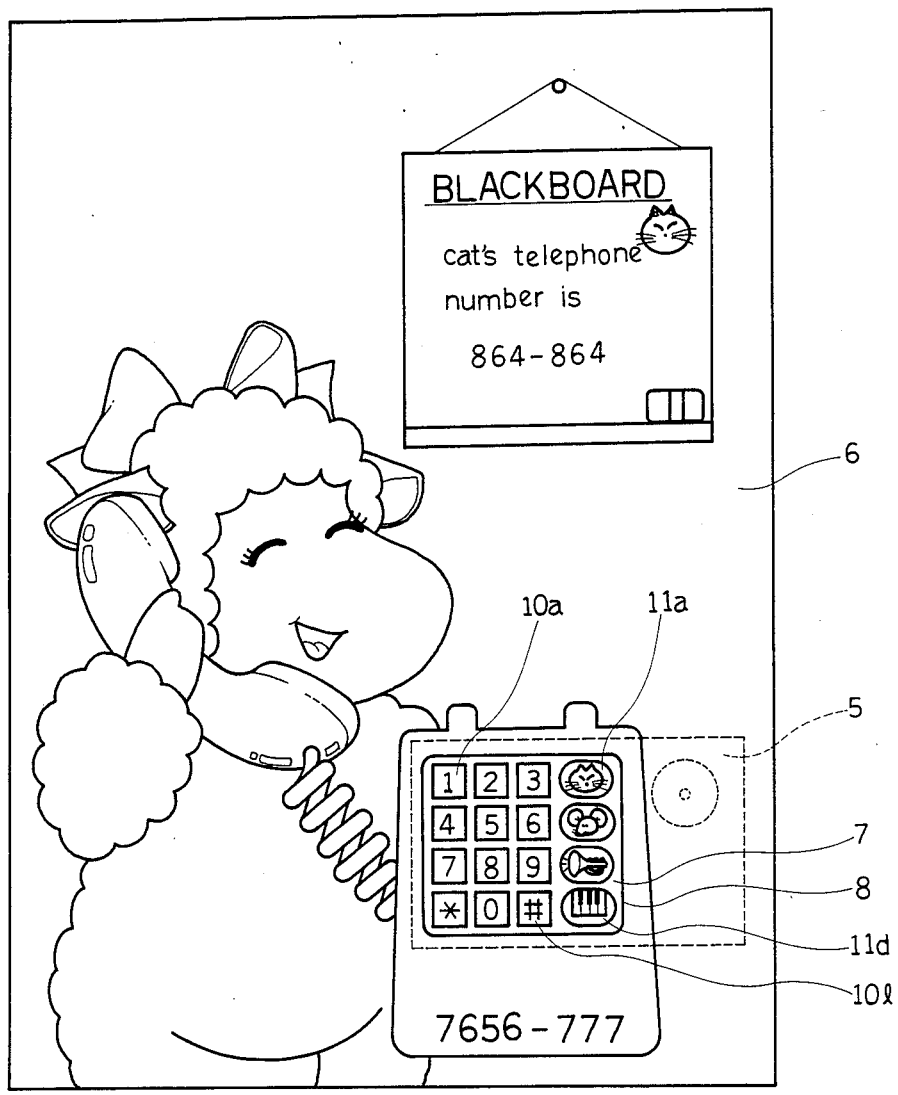
FIG. 3 is the front view of an example of the leaf of the picture book shown in FIG. 1.

FIG. 3 is the illustration in which leaf 6 is placed on the back-bone 4 and a certain page of the picture book remains open.

Switch unit 7 of the sound generator 5 is set to cutout position 8 of leaf 6 which contains picture of a telephone, and thus switch unit 7 looks like buttons of a push-button telephone.

Immitating the pattern of buttons of a push-button telephone, surfaces of switches $10_a$ through $10_l$ respectively denote serial numbers 1 through 9, *, 0, and #. On the other hand, surfaces of switches $11_a$ through $11_d$ are respectively provided with symbols of a cat, a rat, a trumpet, and a piano.

To deal with switches $10_a$ through $10_l$, integrated circuit 13 selects steps of C, D, E, F, G, A, B, Ċ, Ḋ, bḂ, #Ċ, and #F (in which b means a flat and # means a sharp respectively). Likewise, to deal with switches 11$_a$ through 11$_d$, integrated circuit 13 selects a variety of tones of that including sound source of cat's mewing, a rat's squeak, trumpet tones, and piano tones, respectively.

Leaf 6 shown in FIG. 3 contains pictures of a lamb, her telephone, and a blackboard, respectively. Her telephone number 7656-777 is shown on her telephone, while another telephone number 864-864 is shown on the blackboard, which denotes the telephone number of a cat having friendly relations with her.

A child first depresses any of switches 11$_a$ through 11$_d$ for selecting tones. Integrated circuit 13 stores tones of sound source in memory.

When the child makes a telephone call to the lamb, the child depresses buttons 7656-777 which is her telephone number. Each of the depressed button generates sound having steps of "Ḃ Ȧ Ġ Ȧ-Ḃ Ḃ Ḃ". These steps are suitable to be be generatèd vocally by any child. A melody is expressed in terms of the musical scale "si-la-so-la si-si-si" corresponding to a song "Mary had a little lamb". In this way, any child can enjoy operation of telephone as well as nursery rhymes at the same time.

Pretending to be a lamb, when a child makes a telephone call to a cat, the child depress dial buttons 864-864 shown on the blackboard. This generates sound having steps of "Ċ Ȧ Ḟ-Ċ Ȧ Ḟ", which in turn results in the playing of the melody of "Pussy Cat, Pussy Cat" at a musical pitch to which any child can easily sing.

Figure 4:
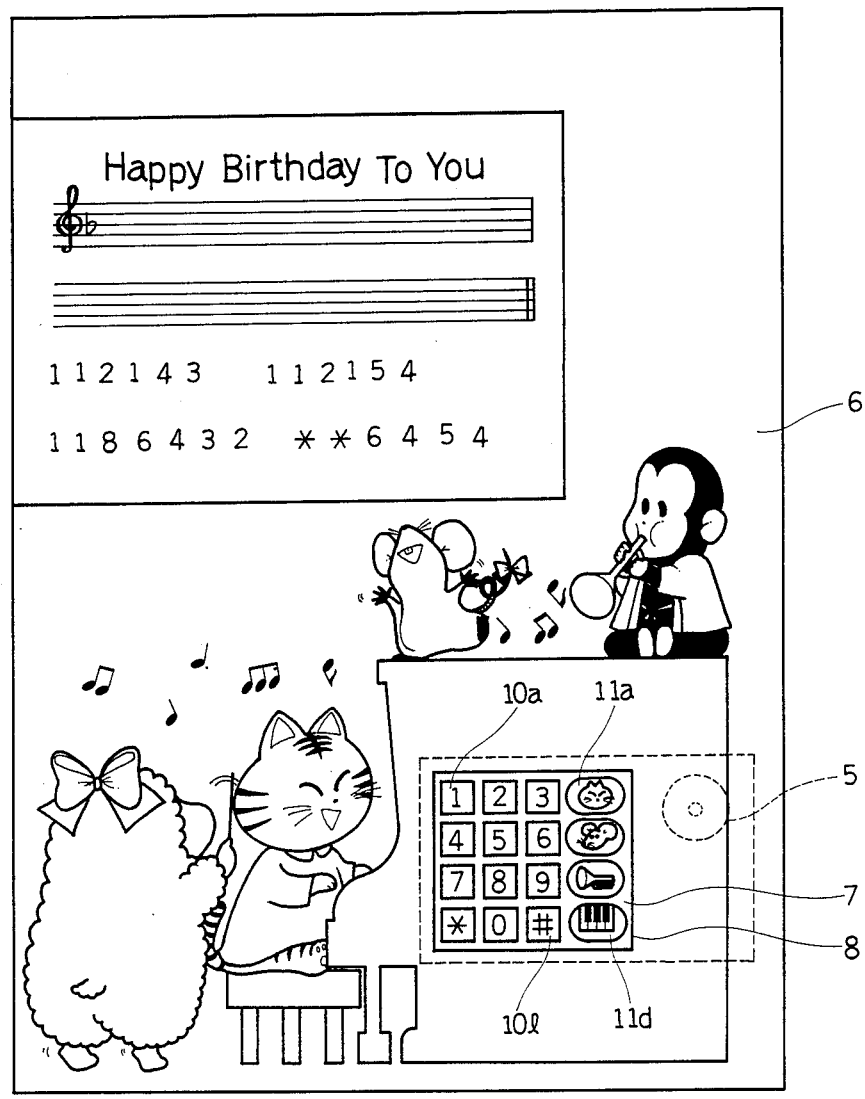
FIG. 4 is the front view of another example of the leaf of the picture book shown in FIG. 1.

FIG. 4 illustrates another leaf 6 which contains cartooned pictures of a lamb, a cat, a rat, a monkey, a trumpet, and a piano, a music score, and numerals/symbols corresponding to switches 10$_a$ through 10$_l$.

Switch unit 7 of sound generator 5 fits in the cutout portion 8, where switch unit 7 matches the symbol of piano. Accordingly, switch unit 7 shown in this page of the picture book no longer reminds of a telephone, but it impresses to be a musical instrument.

When depressing switches 10$_a$ through 10$_l$ in accordance with the step number shown in this page, the melody of "Happy birthday to you" is generated. If selecting cat's mewing, it makes image as if a cat sings a song. If selecting rat's squeak, it makes image as if a rat sings a song. If selecting trumpet tone, it makes image as if blowing a trumpet. If selecting piano tone, it makes image as if playing on the piano.

In summary, according to the preferred embodiment of the picture book related to the present invention, a wide variety of useful advantages and functions can be offered as described below.

(1) Children could satisfy their potential desire to operate a telephone like adults do. In particular, this picture book can easily be operated by infants of about two years of age.

(2) The picture book can be made available for a kind of musical instrument, while it covers Ċ through C̈ which can easily be generated by normal infants, and yet, it also covers C major, F major and D major which are mostly made available for nursery rhymes. This allows children to sing easy, and yet, since the musical instrument accompanied with this picture book effectively deals with the majority of nursely rhymes, children can promote their own auditory education.

(3) Since the notes of the white keys of piano are set in correspondence with serial numbers 1 through 9 of switching means 10$_a$ through 10$_l$ and the notes of the black keys of piano are also set in correspondence with *, 0, and #, it is easy to understand.

(4) Since the switching unit has the function of a musical instruments together with the function of the dial operation part of a telephone, the content of the picture book significantly expands, thus making it possible for the picture book to present a greater number of stories.

The present invention also provides a wide variety of preferred embodiments. For example, switching means could be disposed on the circumference like a dial telephone. Serial numbers 1, 2, . . . applied to switching means may be replaced by or added with the musical scale do, re, mi, . . . . Symbol * may also be replaced by b.

Another preferred embodiment allows a plurality of LEDs to light up themselves when sound is generated.

As is clear from the foregoing description, the picture book related to the present invention mounts a switch unit on part of the book, where the switch unit is arranged in the style of an immitated telephone dial and is provided with a plurality of switching means. The picture book also provides a sound generator having a unit for generating false musical instrumental sounds corresponding to activated switching means mentioned above. The picture book related to the invention is provided with at least one of two kinds of leaves, the one containing a picture to allow the switch unit to share part of the telephone and the other one containing a picture which makes up part of musical instrument.

In other words, the picture book related to the present invention integrally mounts a sound generator, while a switch unit of the sound generator has a plurality of switching means which are disposed in the style of imitating the dial part of telephone.

Depending on the pictures of the leaves of the book, the switch unit becomes part of the telephone unit.

Therefore, an infant can play with the telephone unit and suffice a potential desire to keep in touch with a telephone.

On the other hand, depending on the combination of the telephone dial with symbolic pattern of a leaf of the picture book, the switch unit reminds of a music instrument. When an infant operates switching means, false musical instrument sound is generated.

This allows the infant to enjoy herself with the toy musical instrument and it becomes useful for auditory education.

Furthermore, since the switch unit can work as a telephone or as a musical instrument, the content of the picture book itself can be expanded with a wide variety of subjects.

This invention may variably be modified or changed for embodiment in many ways without departing from the spirit and scope of the invention. Those preferred embodiments described above are thus illustrative and not limitative, while the scope of the invention indicated by and all variations within the meaning of the following claims are thus intended to be included therein.

What is claimed is:

1. A picture book comprising:
   a switch unit mounted on said picture book, said switch unit comprising a plurality of switching means disposed in a style of a dial of a push button telephone;
   a sound generating unit mounted on a part of said picture book generating imitation musical instrument sounds in response to activation of each of said plurality of switching means; and at least one of two kinds of leaves, one of said two kinds of leaves containing a picture for allowing said switch unit to appear to be part of a telephone and another one of said two kinds of leaves containing a picture for allowing said switch unit to appear to be part of a musical instrument.

2. The picture book in accordance with claim 1, comprising both of said two kinds of leaves.

3. The picture book in accordance with claim 2, in which said switch unit comprises twelve switching means which respectively correspond to numbers 1 through 9 together with the symbol *, numeral 0 and symbol #, said imitation musical instrument sound is a piano and said picture of said musical instrument of one of said two leaves is a piano.

4. The picture book in accordance with claim 8, in which said sound generating device generates steps of $\dot{C}, \dot{D}, \dot{E}, \dot{F}, \dot{G}, \dot{A}, \dot{B}, \ddot{C}, \ddot{D}, b\dot{B}, \#\ddot{C}$, and $\#\dot{F}$, in the sequential order corresponding to the numbers 1 through 9, symbol *, numeral 0, and another symbol # of said push-button telephone.

5. The picture book in accordance with claim 4, which further comprises a leaf containing numbers corresponding to the number of buttons of a push-button telephone in the order needed for playing melodies.

* * * * *